US008010956B1

(12) United States Patent
Shtilman et al.

(10) Patent No.: US 8,010,956 B1
(45) Date of Patent: Aug. 30, 2011

(54) CONTROL TRANSFER TABLE STRUCTURING

(75) Inventors: Dmitri Shtilman, Foster City, CA (US); Fu-Hwa Wang, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 1218 days.

(21) Appl. No.: 11/046,074

(22) Filed: Jan. 28, 2005

(51) Int. Cl.
*G06F 9/45* (2006.01)
(52) U.S. Cl. ........................................ 717/159; 717/158
(58) Field of Classification Search .................. 717/158, 717/159, 162; 719/331, 332
See application file for complete search history.

(56) References Cited

U.S. PATENT DOCUMENTS

| | | | | | |
|---|---|---|---|---|---|
| 5,193,180 | A | * | 3/1993 | Hastings | 717/163 |
| 5,896,527 | A | * | 4/1999 | Ceruti et al. | 717/174 |
| 6,006,033 | A | * | 12/1999 | Heisch | 717/158 |
| 6,269,442 | B1 | * | 7/2001 | Oberhauser et al. | 713/1 |
| 6,292,934 | B1 | * | 9/2001 | Davidson et al. | 717/158 |
| 6,295,608 | B1 | * | 9/2001 | Parkes et al. | 714/1 |
| 6,321,240 | B1 | * | 11/2001 | Chilimbi et al. | 707/206 |
| 6,360,361 | B1 | * | 3/2002 | Larus et al. | 717/159 |
| 6,862,729 | B1 | * | 3/2005 | Kuch et al. | 717/158 |
| 6,947,052 | B2 | * | 9/2005 | Jeremiassen | 345/557 |
| 7,143,404 | B2 | * | 11/2006 | Haghighat et al. | 717/159 |
| 7,765,534 | B2 | * | 7/2010 | Archambault et al. | 717/154 |
| 2006/0053416 | A1 | * | 3/2006 | Watanabe | 717/151 |

OTHER PUBLICATIONS

Chilimbi et al., "Making Pointer-Based Data Structures Cache Conscious", Dec. 2000, Computer, vol. 33, Issue 12, pp. 67-74.*
Hashemi, Amir H. et al., "Efficient Procedure Mapping Using Cache Line Coloring" in ACM SIGPLAN Conference on Programming Language Design and Implementation, Jun. 1997, pp. 171-182.
Hashemi, Amir Hooshong et al., "Cache Line Coloring Using Real and Estimated Profiles", Digital Technical Journal Special Issue on Tools and Languages, Feb. 1999, 18 pages.
Cooper, Keith and Torczon, Linda, "Profile Guided Code Positioning", ACM SIGPLAN Notices, vol. 25, Issue 6, Jun. 1990, pp. 16-27.

* cited by examiner

*Primary Examiner* — Lewis A Bullock, Jr.
*Assistant Examiner* — Jue Wang
(74) *Attorney, Agent, or Firm* — Polsinelli Shughart, PC (57) ABSTRACT

It has been discovered that a control transfer table can be structured to reduce the overhead resulting from its use (e.g., misses from accessing the control transfer table). Entries of a control transfer table (e.g., a jump table or a procedure linkage table) can be organized in accordance with their respective use frequencies, as well as other parameters. For example, entries can be organized in a manner that would group the most frequently used entries, thus facilitating their contemporaneous availability in a memory (e.g., cache). The use frequencies may be determined from profile information for a code that references the control transfer table.

21 Claims, 5 Drawing Sheets

CONTROL TRANSFER TABLE STRUCTURING

BACKGROUND

1. Field of the Invention

The present invention relates to the field of computers, and more specifically relates to structuring control transfer tables.

2. Description of the Related Art

The typical software application consists of a dynamically linked executable and several shared objects (or dynamic libraries) which are linked together at runtime to form an executable process. The main executable and shared objects that it depends on are called loadable objects or modules. Since there are usually numerous cross-module dependencies that cannot be resolved at compile time, the compiler and linker provide facilities that reduce the amount of work that needs to be done at runtime. One such facility is a control transfer table (e.g., a Procedure Linkage Table (PLT), a jump table, etc.). A control transfer table is used for execution transfers (such as function calls) from one module to another. Whenever a cross-module execution transfer request occurs in code, a compiler generates instructions to transfer execution locally to an entry in the control transfer table. The first time this entry actually gets called, the runtime linker updates it to transfer execution to the requested function in another module. Effectively, all calls to an external function go through one place, the control transfer table. Instead of updating all of these calls at runtime to refer to the external function, only the entry for the external function is updated.

While a control transfer table provides flexibility, it also induces an overhead on the cross-module function calls. Each cross-module function call goes through a control transfer code that consists of an address calculation and a jump to the called function. This code is loaded and executed, which puts additional demand on the memory hierarchy. The random nature of control transfer table generation results in a less effective memory hierarchy utilization. This overhead from the control transfer table can adversely impact the performance, especially for more cache-hungry applications. In large transaction processing applications, control transfer table related cache misses may account for more than 3% of all the instruction cache misses. Furthermore, the overhead may be even more noticeable in applications that have large control transfer tables spanning multiple memory pages. The most frequently accessed entries (i.e., the hot entries) in these tables are usually sparse, which results in heavier paging.

Modern compilers provide numerous optimizations that restructure code in an attempt to better utilize the underlying system's memory hierarchy (e.g., function and basic block ordering). However, restructuring a control transfer table goes beyond the realm of compiler optimizations, because a control transfer table is created by a linker. The compiler has little control over construction of the control transfer table by the linker.

SUMMARY

It has been discovered that a control transfer table can be structured to reduce misses from accessing the control transfer table. The structuring can rely on collected profile information that indicates execution frequency (hotness) of entries of the control transfer table. A software tool utilizes this information to structure or organize the control transfer table in accordance with hotness of the entries, as well as particular characteristics of an architecture and/or an application. Entries can be regrouped with various techniques, such as ordering by hotness, which facilitates increased density of the most frequently used entries. Other techniques may be based on caller-callee relationships, cache line sizes, identifying the code/data that a particularly placed entry will clash with and avoiding placement that may lead to "hot code/data/entry-hot entry" clashes, etc. These techniques ensure that when a portion of the control transfer table is fetched one level closer to the processor, this portion contains more heavily used entries, as well as fewer underutilized entries likely to be evicted due to a conflict with other parts of the program. For example, if hot entries are grouped together, a fetch of a hot entry will also bring its hot neighbors to the cache, making them available for access as well (more cache hits) and thus lowering a chance for a cache miss by not polluting the cache with underutilized, cold entries.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The description that follows includes exemplary systems, methods, techniques, instruction sequences and computer program products that embody techniques of the present invention. However, it is understood that the described invention may be practiced without these specific details. For instance, reference is made to a control transfer table which may be a jump table, a procedure linkage table, etc. In addition, although some ordering techniques are described in detail, these described techniques and other techniques may be employed individually or in various combinations to improve memory hierarchy performance. For example, a given number of those entries of a control transfer table that exceed a threshold of executions may be ordered instead of ordering all entries of the table. In other instances, well-known protocols, structures and techniques have not been shown in detail in order not to obscure the invention.

Ordering entries of a control transfer table by hotness creates a concentrated hot area. Most of the control transfer table related fetches will be from that area, and most of the fetched entries will be hot entries. Having a greater number of hotter entries reside in memory longer improves the chances of finding the next needed entry already available in memory, thus reducing misses in memory (e.g., instruction cache misses, external cache misses, etc.), as well as prevent entries from evicting each other. This ordering also reduces page fault rate, which typically occurs from sparse population of hot entries of a control transfer table over multiple pages. A concentrated hot area normally fits into just a few of the pages that are normally used. This also reduces the number of translation buffer (i.e., TLB) misses as there will be fewer address translations that need to be cached.

Figure 1:
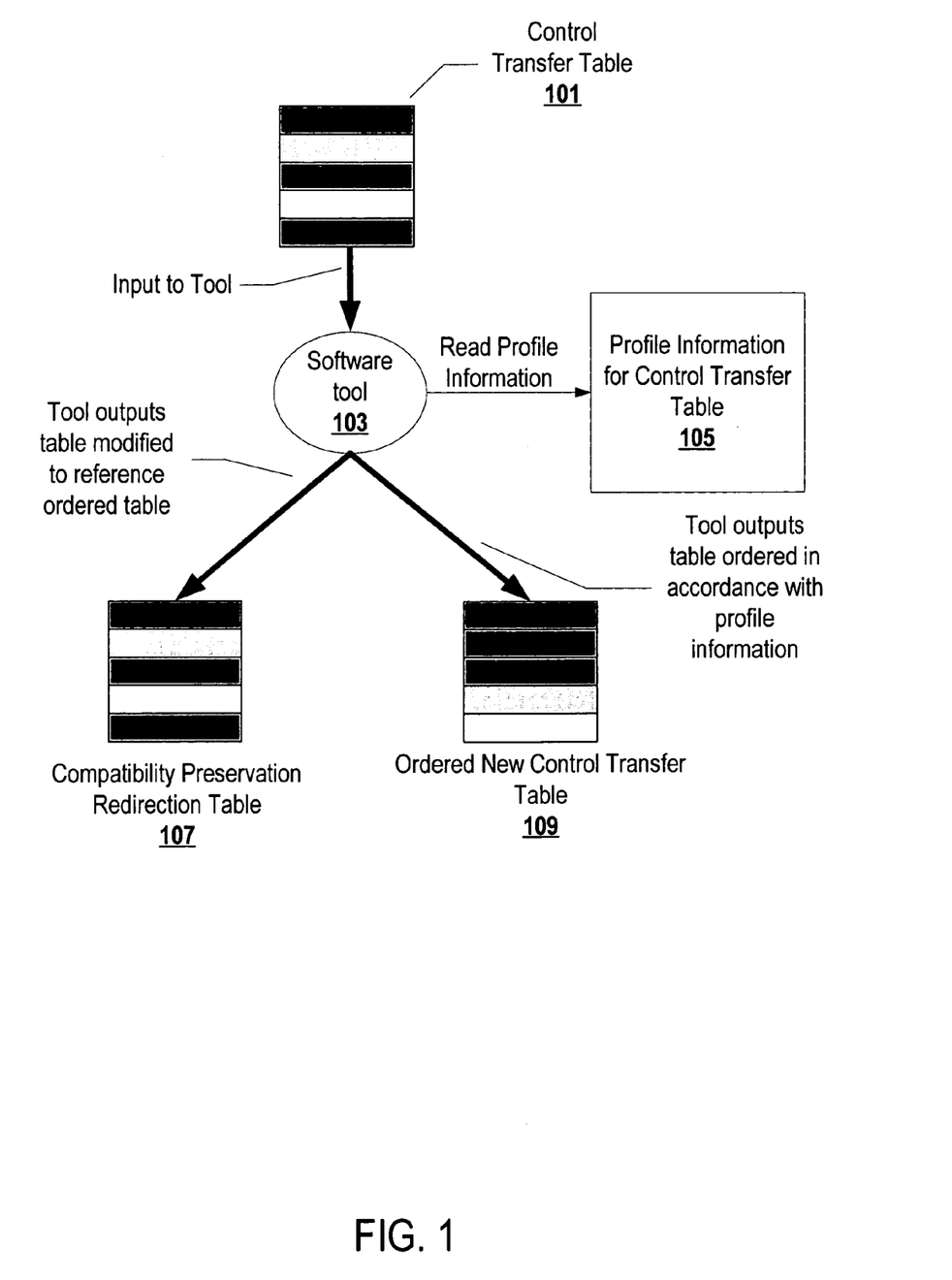
FIG. 1 depicts an exemplary software tool that generates a compatibility preservation redirection table and an ordered control transfer table.

FIG. 1 depicts an exemplary software tool that generates a compatibility preservation redirection table and an ordered control transfer table. A control transfer table 101 is input into a software tool 103. The control transfer table 101 may be separate from its corresponding executable code or part of an executable code or binary, etc. The software tool 103 may be part of a code execution environment such as a runtime linker, a separate tool within the code execution environment, a tool within a code preparation environment such as a static linker, a tool separate from the code preparation environment, etc. The software tool 103 reads profile information 105 for the control transfer table 101. The profile information 105 may be embedded in object files, binary, separate files, etc. Any of a number of techniques may be used to obtain the profile information 105 (e.g., a compiler mechanism, a tool that instruments binary for profiling, hardware profiling, etc.).

The profile information 105 indicates access frequency, or hotness, of the control transfer table 101 entries. The software tool 103 may be a linker that reads the profile information from a file generated by a compiler or reads the intermediate code representations with embedded profile information, may be a tool that reads a binary produced by a compiler and linker with profile information embedded inside or a separate file with profile information, may be a tool that has access to profile counts in an optimized binary generated from a version of the original binary instrumented by a tool to collect execution counts, etc. The software tool 103 reads the profile information 105 and, in accordance with the profile information, orders the entries of the control transfer table 101 to generate a new ordered control transfer table 109.

Profile information may be applied for grouping of hot control transfer table entries differently. For example, if profile information for the entries is not directly available, a tool may read profile information for basic blocks from an input binary, object files or separate file, and propagate the profile counts for the basic blocks to the entries used in these blocks. Propagating the profile information, for example, involves applying code block execution counts to the entries of the control transfer table. If a code block includes references to 2 entries and the code block is executed 10,000 times, then each of the referenced entries is considered as accessed 10,000 times. In another example, a static linker reads profile information stored in input object files, and creates a list of the control transfer table entries. The static linker then propagates the profile information to the list and groups the entries in accordance with hotness (e.g., orders the entries according to hotness). The linker generates a binary with an ordered control transfer table.

In addition, the software tool 103 modifies the initial control transfer table 101 and generates a compatibility preservation redirection table 107, which maintains compatibility with code that is not updated to reference the new control transfer table 109. A software tool that reads a program with a control table already constructed (e.g., by a linker), such as a software tool separate from a code preparation environment, generates the compatibility preservation redirection table. However, if regrouping or structuring of the control transfer table is implemented by a software tool that is part of a code preparation environment, such as a linker, then the software tool may not generate a compatibility preservation redirection table. For example, a static linker may be extended to structure a control transfer table to concentrate entries according to hotness of entries during construction of the control transfer table. The static linker receives object files of a program as input with relocations that require construction of the control transfer table. Grouping together of the hottest entries defines the order of the entries in the control transfer table. The software tool resolves these locations in code causing the program to use the defined order. Depending on the implementation of the software tool, the software tool may generate the new ordered control transfer table 109 after construction of the control transfer table as in FIG. 1, during construction of the control transfer table, for example by a linker, etc.

FIG. 1 is provided as an exemplary illustration. Various techniques can be applied to structure a control transfer table. These techniques may include, but are not limited to, techniques based on caller-callee relationships, reducing conflicts, etc. These techniques can be introduced individually, or be applied in coordination to facilitate efficient utilization of a control transfer table. Exemplary structuring of a control transfer table based on caller-callee relationships involves (1) building a call graph, (2) building sequences of entries that are likely to be used shortly one after another, and (3) building the final entry order from these sequences. Grouping the entries of a control transfer table to minimize the number of clashes of entries with other parts of the program, such as code, data, other entries, etc. Exemplary structuring of a control transfer tabled based on reducing conflicts involves (1) finding units (e.g., blocks, modules, etc.) of the program that will fight for the same memory locations as the entries, (2) deciding if an entry can be placed against a part of the program (based on entry's and the unit's hotness), and (3) finding a better location for the new (optimized) table. In addition to employing the above techniques or any combination of the above techniques or other techniques, can be enhanced with additional knowledge of a program and/or architecture.

Figure 2:
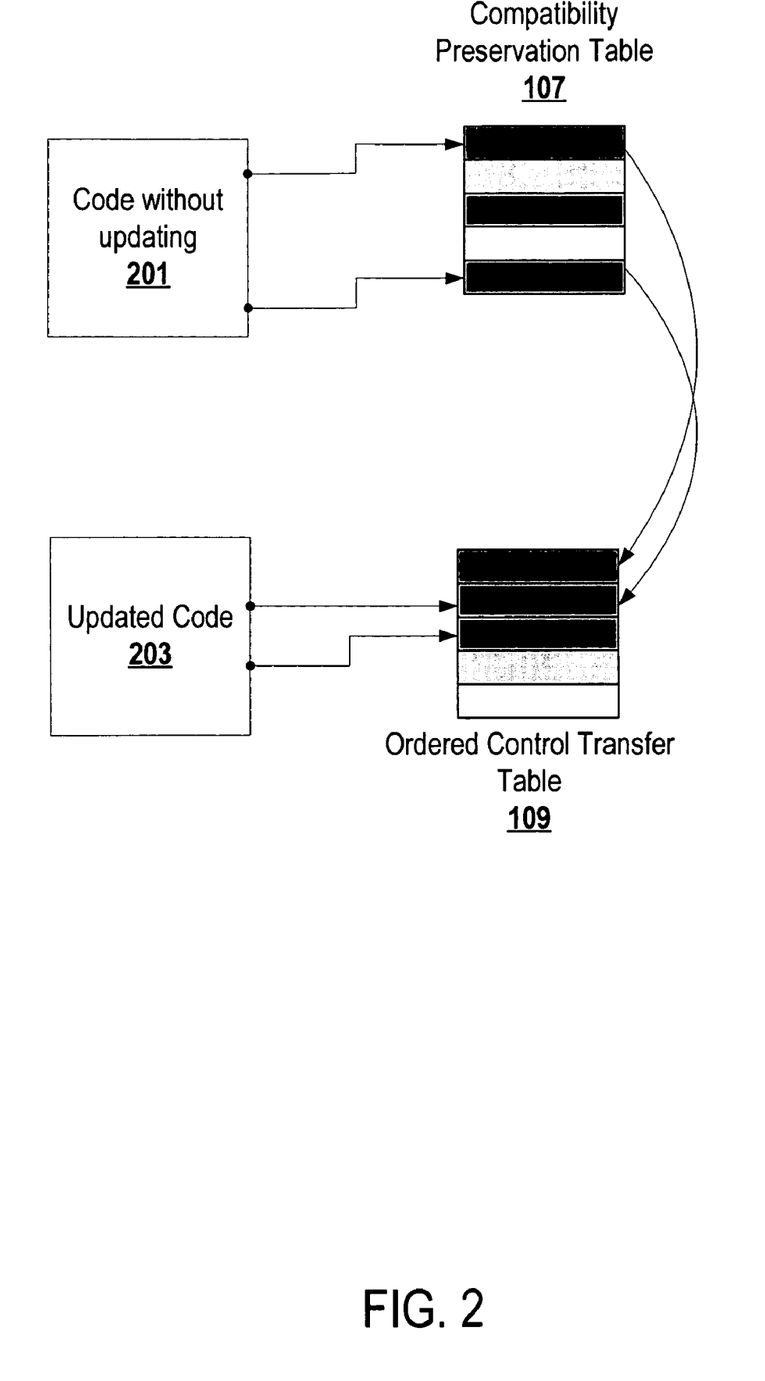
FIG. 2 depicts use of the new ordered control transfer table and the compatibility preservation redirection table.

FIG. 2 depicts use of the new ordered control transfer table and the compatibility preservation redirection table. Each of the entries of the compatibility preservation redirection table 107 references a corresponding entry in the new ordered control transfer table 109. A code 201 that has not been updated to reference the new ordered control transfer table 109 (either cannot or need not be updated) references the entries of the compatibility preservation redirection table 107. The code 201 may not be updated because it has been designated as non-modifiable code (e.g., to prevent optimizations that may incur undesired side effects). If the software tool cannot recognize references to the new ordered control transfer table 109, then it cannot update code to reference the new ordered control transfer table 109. If a user does not want to the software tool to update certain references to the control transfer table, then the software tool does not update those references. When the code 201 references the compatibility preservation redirection table 107, the mechanism that handles the control transfer (e.g., a separate thread, a trap handler, etc.) reads the referenced entry and follows a reference to a corresponding entry of the new ordered control transfer table 109 (i.e., control is transferred to a corresponding entry in the new ordered control transfer table 109). An updated code 203 directly references the entries of the new ordered control transfer table 109.

Figure 3:
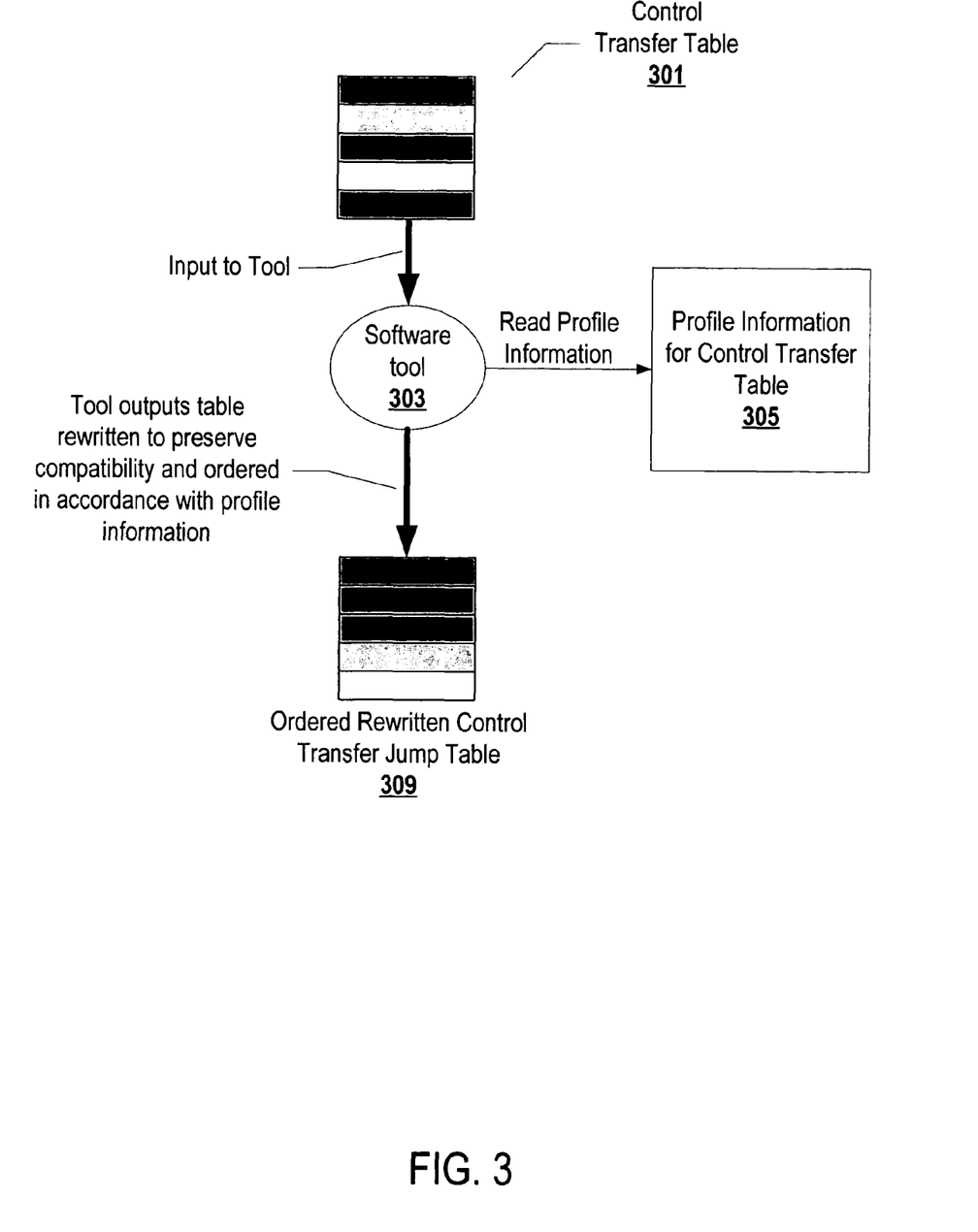
FIG. 3 depicts an exemplary tool that modifies a control transfer table to impose a new order on entries.

As previously stated, a control transfer table may be modified to group entries by hotness and preserve compatibility with code that was not updated. FIG. 3 depicts an exemplary tool that modifies a control transfer table to impose a new order on entries. In the example illustrated by FIG. 3, the new imposed order is in accordance with hotness of entries. A software tool 303 receives a control transfer table 301 as input (e.g., as part of a binary). The software tool 303 reads profile information 305, which is similar to the profile information

105 of FIG. 1. However, instead of generating a new control transfer table, the software tool 303 rewrites the control transfer table 301 and orders the entries in accordance with the profile information 305. The rewritten control transfer table 309 includes embedded references to preserve compatibility with non-annotated code.

Figure 4:
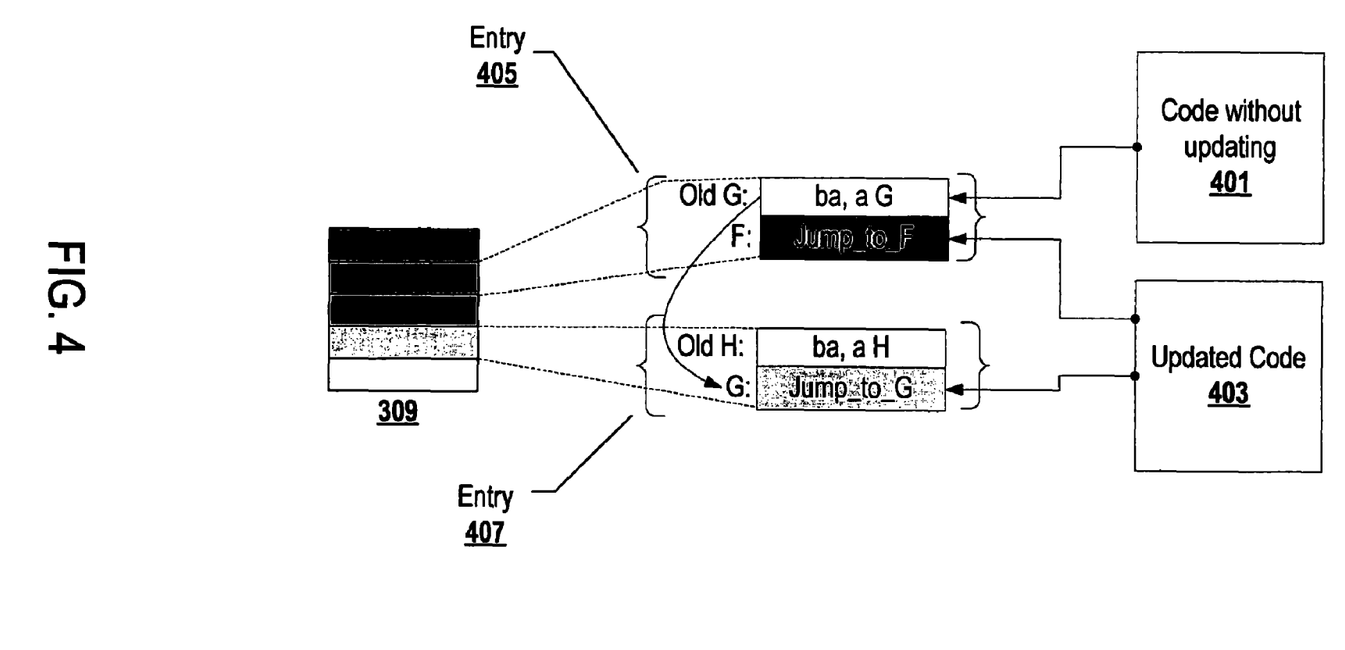
FIG. 4 depicts exemplary use of the rewritten control transfer table.

FIG. 4 depicts exemplary use of the rewritten control transfer table. The rewritten control transfer table 309 includes entries 405 and 407. The entry 405 has been modified to indicate an Old G indirection reference for a new entry G and a reference for a new entry F. The Old G is maintained for compatibility with a non-updated code 401. The entry 405 has been modified to branch to a new location within the control transfer table 309 of the reference to new entry G, which is at entry 407, to preserve compatibility as well as indicate an entry that has been moved to reorder entries by their hotness. A code 403 is updated to use the new entry locations F (frequently used) and G (less frequently used and moved to occur later in the control transfer table 309), respectively found at entries 405 and 407.

When the non-updated code 401 is executed, a reference to entry G is encountered. The non-updated code 401 requests access to the original location of G in the control transfer table 309, which is entry 405. The mechanism handling access to the control transfer table 309 accesses the entry 405 and then follows the branch always operation to entry 407 and invokes module G. The updated code 403 references both entries F and G. When the updated code 403 is executed, the entry F is accessed via entry 405, without indirection. In addition, when the updated code 403 references module G, it directly accesses the entry 407.

As already stated, structuring techniques are not limited to simple ordering by hotness. Structuring may also be applied to a chosen set of table entries, based on a certain criteria. For example, a tool may identify and work on just those entries that are accessed beyond a certain threshold number of accesses. The control transfer table entries may also be organized in accordance with other information, such as temporal locality, spatial locality, etc. Furthermore, coloring can be applied to prevent entries from conflicting in memory. Coloring may also be utilized to prevent control transfer table entries from conflicting with program code and/or program data.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 5:
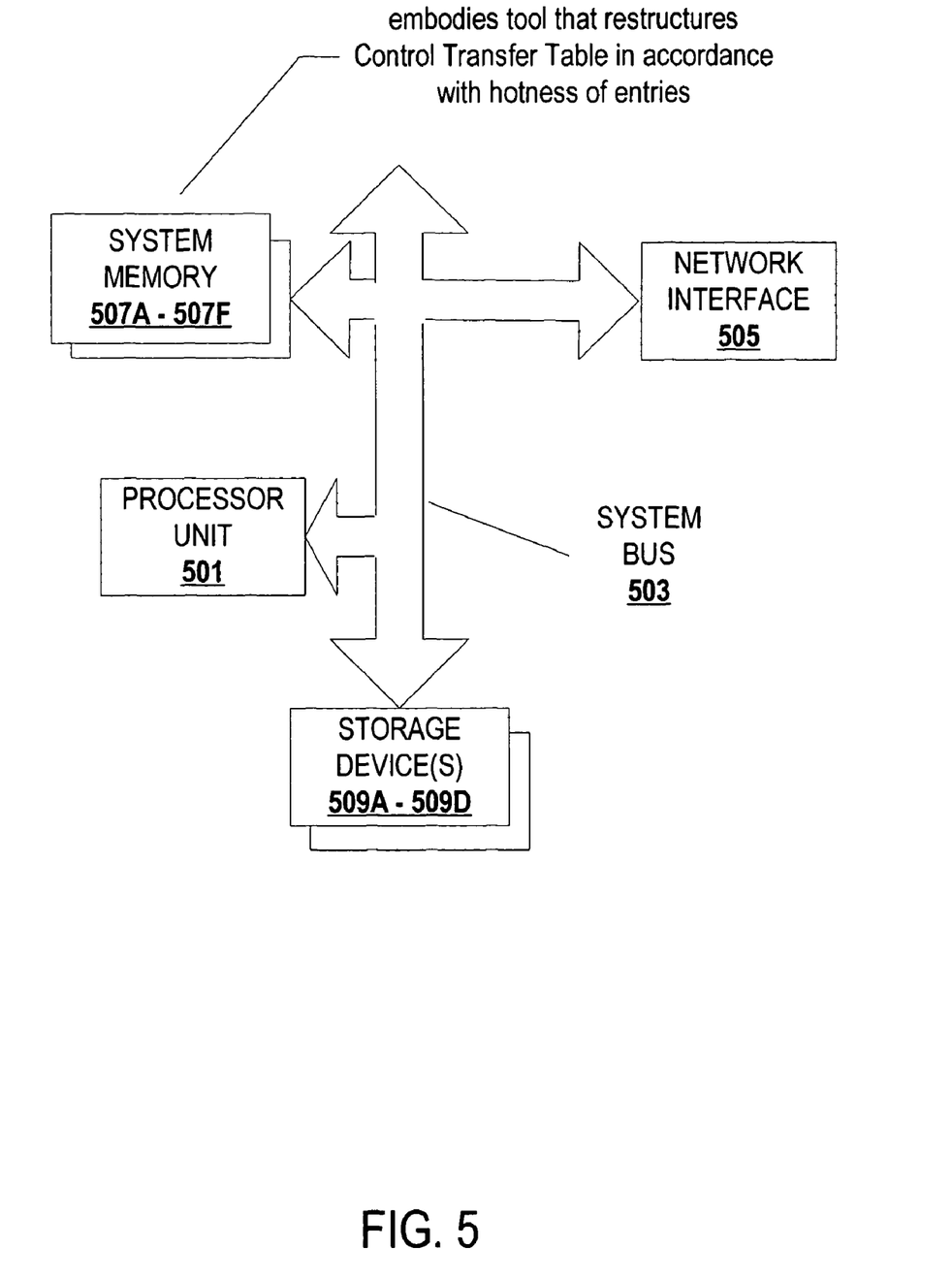
FIG. 5 depicts an exemplary computer system according to realizations of the invention.

FIG. 5 depicts an exemplary computer system according to realizations of the invention. A computer system 500 includes a processor unit 501 (possibly including multiple processors, a single threaded processor, a multi-threaded processor, a multi-core processor, etc.). The computer system 500 also includes a system memory 507A-507F (e.g., one or more of cache, SRAM DRAM, RDRAM, EDO RAM, DDR RAM, EEPROM, etc.), a system bus 503 (e.g., LDT, PCI, ISA, etc.), a network interface 505 (e.g., an ATM interface, an Ethernet interface, a Frame Relay interface, etc.), and a storage device(s) 509A-509D (e.g., optical storage, magnetic storage, etc.). Realizations of the invention may include fewer or additional components not illustrated in FIG. 5 (e.g., video cards, audio cards, additional network interfaces, peripheral devices, etc.). The processor unit 501, the storage device(s) 509A-509D, the network interface 705, and the system memory 507A-507F are coupled to the system bus 503. The system memory 507A-507F embodies a tool that condenses entries of a control transfer table by access frequency, although part or all of the tool may be embodied within the processing unit 501, the storage device(s) 509A-509D, etc. For example, the tool may be part of an operating system to dynamically restructure a control transfer table at runtime to adjust to changing workload While the invention has been described with reference to various realizations, it will be understood that these realizations are illustrative and that the scope of the invention is not limited to them. Many variations, modifications, additions, and improvements are possible. For example, order may be a variable in construction of a control transfer table, a table may be constructed without order and then rewritten in accordance with ordering of the entries, a new table and a compatibility table (the old control transfer table) may be maintained, etc. In another example, entries accessed more than a threshold number of times may be organized to occur at the beginning of a control transfer table without rearranging other entries, the hottest entries beyond a given threshold may be ordered while other entries are not ordered, etc. More generally, realizations in accordance with the present invention have been described in the context of particular realizations. Functionality may be separated or combined in blocks differently in various realizations of the invention or described with different terminology. These and other variations, modifications, additions, and improvements may fall within the scope of the invention as defined in the claims that follow.

What is claimed is:

1. A machine-executable code stored on a machine-readable medium, the machine executable code configured to:
   structure at least a portion of a control transfer table in accordance with reducing the number of clashes of the entries of the control transfer table with other parts of a program by:
     setting a threshold level of executions of an entry of the control transfer table by the program;
     identifying those entries of the control transfer table that exceed the threshold level of executions;
     identifying units of the program that access the same memory locations as the entries of the control transfer table; and
     reordering the entries of the control transfer table that exceed the threshold level of executions based on the memory locations accessed by the units of the program;
   wherein the reordering allows at least some of the most frequently fetched entries to reside in memory contemporaneously, and wherein the machine executable code stored on the machine-readable medium further is configured to:
     receive an access request from a program including non-modifiable code, wherein the non-modifiable code can not be updated to use the reordered control transfer table to prevent optimizations that may incur undesirable side effects; and
     generate a separate compatibility preservation redirection table, wherein each of the entries of the compatibility preservation redirection table references a corresponding entry in the reordered control transfer table such that, when the compatibility preservation redirection table is accessed by the non-modifiable code, control is transferred to the control transfer table to preserve compatibility of code that is not updated to reference the reordered control transfer table.

2. The machine-executable code of claim 1 further configured to read profile information that indicates the frequency of fetches of the entries.

3. The machine-executable code of claim 1, wherein the structuring of the control transfer table comprises the machine-executable code ordering entries of the control transfer table in accordance with respective frequencies of fetches of the entries and to reduce the number of clashes of the entries with other parts of the program.

4. The machine-executable code of claim 1, wherein the structuring of the control transfer table includes constructing the control transfer table or rewriting the control transfer table.

5. The machine-executable code of claim 1, wherein a code preparation environment or a code execution environment includes the machine-executable code.

6. The machine-executable code of claim 1 further comprising structuring the control transfer table in accordance with at least one of cache line size, temporal locality, spatial locality, and caller-callee relationships.

7. A computer-implemented method of structuring a control transfer table comprising:
utilizing a processor to execute computer-executable instructions stored in a computer-readable memory device to cause a computer to perform the operations of:
accessing a control transfer table stored in the computer-readable memory device; and
organizing at least a portion of the entries of the control transfer table based, at least in part, on reducing the number of clashes of the entries with other parts of a program by:
setting a threshold level of executions of an entry of the control transfer table by the program;
identifying those entries of the control transfer table that exceed the threshold level of executions;
identifying units of the program that access the same memory locations as the entries of the control transfer table; and
reordering the entries of the control transfer table that exceed the threshold level of executions based on the memory locations accessed by the units of the program;
wherein the reordering allows at least some of the most frequently fetched entries to reside in memory contemporaneously, and wherein the organizing further comprises:
receiving an access request from a program including non-modifiable code, wherein the non-modifiable code can not be updated to use the reordered control transfer table to prevent optimizations that may incur undesirable side effects; and
generating a separate compatibility preservation redirection table, wherein each of the entries of the compatibility preservation redirection table references a corresponding entry in the reordered control transfer table such that, when the compatibility preservation redirection table is accessed by the non-modifiable code, control is transferred to the control transfer table to preserve compatibility of code that is not updated to reference the reordered entries.

8. The computer-implemented method of claim 7, wherein the control transfer table includes a jump table or a procedure linkage table.

9. The computer-implemented method of claim 7, wherein the organizing includes ordering the entries in accordance with respective fetch frequencies or grouping together at least some of the entries in accordance with respective fetch frequencies thereof.

10. The computer-implemented method of claim 7, wherein the computer further performs the operation of structuring the control transfer table in accordance with at least one of spatial locality and temporal locality.

11. The computer-implemented method of claim 7, wherein the computer further performs the operation of propagating profile information to the control transfer table, wherein the profile information includes the fetch frequencies.

12. The computer-implemented method of claim 11, wherein the propagating comprises ascertaining fetch frequencies for the entries based on the execution frequencies of code blocks that reference the entries.

13. The computer-implemented method of claim 7, wherein the computer further performs the operation of utilizing coloring to prevent conflict between the entries and at least one of other entries of the control transfer table, program code, and program data.

14. A computer program product embodied on one or more machine-readable media, the computer program product comprising:
a first code embodied on the one or more machine-readable media and executable to organize at least some entries of a control transfer table in accordance with reducing the number of clashes of the entries with other parts of a program, wherein the organizing comprises:
setting a threshold level of executions of an entry of the control transfer table by the program;
identifying those entries of the control transfer table that exceed the threshold level of executions;
identifying units of the program that access the same memory locations as the entries of the control transfer table; and
reordering the entries of the control transfer table that exceed the threshold level of executions based on the memory locations accessed by the units of the program, wherein the reordering allows at least some of the most frequently fetched entries to reside in memory contemporaneously;
receiving an access request from a program including non-modifiable code, wherein the non-modifiable code can not be updated to use the reordered control transfer table to prevent optimizations that may incur undesirable side effects; and
generating a separate compatibility preservation redirection table, wherein each of the entries of the compatibility preservation redirection table references a corresponding entry in the reordered control transfer table such that, when the compatibility preservation redirection table is accessed by the non-modifiable code, control is transferred to the organized entries of the control transfer table to preserve compatibility of code that is not updated to reference the reordered control transfer table.

15. The computer program product of claim 14, wherein the control transfer table includes a jump table or a procedure linkage table.

16. The computer program product of claim 14, wherein the organizing includes ordering the entries or grouping together at least some of the entries in accordance with respective fetch frequencies thereof.

17. The computer program product of claim 14, wherein the organizing includes the first code executable to receive an input control transfer table and to modify the control transfer table to organize the entries.

18. An apparatus comprising:
a memory operable to host a control transfer table;
means for organizing at least a portion of the entries of the control transfer table in accordance with reducing the number of clashes of the entries with other parts of a program by;
setting a threshold level of executions of an entry of the control transfer table by the program;
identifying those entries of the control transfer table that exceed the threshold level of executions;
identifying units of the program that access the same memory locations as the entries of the control transfer table; and
reordering the entries of the control transfer table that exceed the threshold level of executions based on the memory locations accessed by the units of the program, wherein the reordering allows at least some of the most frequently fetched entries to reside in memory contemporaneously;
receiving an access request from a program including non-modifiable code, wherein the non-modifiable code can not be updated to use the reordered control transfer table to prevent optimizations that may incur undesirable side effects; and
means for generating a separate compatibility preservation redirection table, wherein each of the entries of the compatibility preservation redirection table references a corresponding entry in the reordered control transfer table such that, when the compatibility preservation redirection table is accessed by the non-modifiable code, control is transferred to the control transfer table to preserve compatibility of code that is not updated to reference the reordered entries.

19. The apparatus of claim 18 further comprising means for utilizing cache coloring to prevent collisions in the memory between the entries.

20. The apparatus of claim 18 further comprising means for utilizing cache coloring to prevent collisions in the memory between the entries and at least one of program code and program data.

21. The apparatus of claim 18 wherein the memory includes cache.

* * * * *